United States Patent
Yang et al.

(10) Patent No.: US 8,174,959 B2
(45) Date of Patent: May 8, 2012

(54) AUCTION BASED RESOURCE ALLOCATION IN WIRELESS SYSTEMS

(75) Inventors: Kai Yang, Princeton, NJ (US); Narayan Prasad, Monmouth Junction, NJ (US); Xiaodong Wang, New York, NY (US)

(73) Assignee: NEC Laboratories America, Inc., Princeton, NJ (US)

( * ) Notice: Subject to any disclaimer, the term of this patent is extended or adjusted under 35 U.S.C. 154(b) by 523 days.

(21) Appl. No.: 12/399,769

(22) Filed: Mar. 6, 2009

(65) Prior Publication Data

US 2009/0232074 A1   Sep. 17, 2009

Related U.S. Application Data

(60) Provisional application No. 61/035,400, filed on Mar. 11, 2008.

(51) Int. Cl.
*H04J 11/00* (2006.01)
*H04J 3/16* (2006.01)

(52) U.S. Cl. ........................ 370/208; 370/468

(58) Field of Classification Search .............. 370/328, 370/329, 203, 208, 209, 210, 468; 705/37, 705/14.71; 375/260, 316
See application file for complete search history.

(56) References Cited

U.S. PATENT DOCUMENTS

| | | | |
|---|---|---|---|
| 7,586,990 B2 * | 9/2009 | Subramanian et al. | 375/260 |
| 2007/0226118 A1 * | 9/2007 | Gill | 705/37 |
| 2008/0075032 A1 * | 3/2008 | Balachandran et al. | 370/317 |

OTHER PUBLICATIONS

I. C. Wong and B. L. Evans, "Optimal OFDMA subcarrier, rate, and power allocation for ergodic rates maximization with imperfect channel knowledge," Proc. IEEE Int. Conf. on Acoustics, Speech, and Signal Proc. (ICASSP), 2007.
W. Yu and R. Liu, "Dual methods for nonconvex spectrum optimization of multicarrier systems," IEEE Trans. Commun., vol. 54, No. 7, pp. 1310-1322, Jul. 2006.
H. Zhu, Z. Li, and K. J. R. Liu, "Fair multiuser channel allocation for OFDMA networks using Nash bargaining solutions and coalitions," IEEE Trans. Commun., vol. 53, No. 8, pp. 1336-1376, Aug. 2005.
K. Kim and Y. Han, "Joint subcarrier and power allocation in uplink OFDMA systems," IEEE Commun. Let., vol. 9, No. 6, pp. 526-528, Jan. 2006.

* cited by examiner

*Primary Examiner* — Hanh Nguyen
(74) *Attorney, Agent, or Firm* — Joseph Kolodka; Bao Tran

(57) ABSTRACT

Systems and methods to assign one or more resources in a multi-user cellular Orthogonal Frequency-Division Multiple Access (OFDMA) uplink includes specifying a resource allocation problem for one or more resources; converting the resource allocation problem into an assignment problem; solving the assignment problem through an auction; and allocating one or more resources to cellular users to maximize a system utility.

11 Claims, 8 Drawing Sheets

AUCTION BASED RESOURCE ALLOCATION IN WIRELESS SYSTEMS

This application claims priority to U.S. Provisional Application Ser. No. 61/035,400 filed on Mar. 11, 2008, the content of which is incorporated by reference.

BACKGROUND

Orthogonal frequency-division multiple-access (OFDMA) has emerged as a promising multiple-access technique for next-generation wireless networks operating over wideband multi-path fading channels. Classical OFDMA, which involves assigning orthogonal (non-overlapping) sub-carriers among different users, is an effective means to handle multi-path fading with low-complexity receivers and to obtain multi-user diversity gains via channel-dependent frequency-domain scheduling. Consequently, resource allocation for classical single-cell OFDMA systems has been the subject of intense research in recent years. The methods designed for single-cell OFDMA systems are directly applicable to a multi-cell OFDMA system employing static frequency reuse wherein inter-cell interference is avoided by ensuring adjacent cells are allocated orthogonal frequency bands. This allows for autonomous resource allocation at each base-station at the expense of reduced system throughput. The resource allocation problems for OFDMA systems are in general non-linear and non-convex which has prompted several heuristic approaches. It is also known that many OFDMA resource allocation problems satisfy a time sharing property in the limit of large number of subcarriers and hence in principle optimal solutions can be obtained via dual decomposition techniques. Unfortunately, the complexities of the dual decomposition technique as well as many heuristic algorithms are still too high for most practical cellular systems being considered for deployment.

Future wireless network evolutions are envisioned to employ a full (or an aggressive) frequency reuse. However, co-channel interference caused by transmissions in neighboring cells will be a major impairment that limits throughput. Consequently, proactive inter-cell interference mitigation techniques are required. Joint resource allocation over a cluster of neighboring cells via base-station coordination is a promising solution. However, most recent works focused on downlink systems and the design of distributed uplink resource allocation algorithms that require limited information exchange among base-stations is still in its infancy.

SUMMARY

Systems and methods for performing radio resource allocation system based on the auction method for uplink OFDMA cellular networks are disclosed.

In one aspect, Systems and methods to assign one or more resources in a multi-user single cell Orthogonal Frequency-Division Multiple Access (OFDMA) uplink includes specifying a resource allocation problem for the one or more resources; converting the resource allocation problem into an assignment problem; solving the assignment problem through an auction; and allocating the one or more resources to cellular users to maximize a system utility.

Advantages of embodiments of the system may include one or more of the following. The system allocates resource based on the auction method with very low complexity and can offer near-optimal performance. The system works with cellular systems that employ the traditional static frequency reuse as well as the next-generation systems that aim to achieve a universal frequency reuse via base-station coordination. The system works with finite input alphabets and also accounts for non-ideal practical outer codes, and can be implemented in a distributed manner, when applied for multi-cell resource allocations. The system also handles power and bandwidth constraints that are motivated by practical concerns. The system exhibits very low complexity and is well suited for parallel implementations. Simulation results demonstrate that it offers near-optimal performance.

The system provides efficient uplink resource allocation for OFDMA networks. Here the term resource refers to sub-carriers, power as well as the modulation and coding schemes (MCS). The resource allocation processes provide practical MCS rather than the commonly assumed Gaussian input alphabets and ideal outer codes. While Gaussian alphabets greatly simplify analysis, their main drawback is that the capacity with Gaussian input alphabet is unbounded in the signal-to-noise ratio (SNR) which results in too much power being allocated by a user to its stronger subcarriers. As a remedy many works introduce an SNR gap (or penalty). The system explicitly considers practical modulations such as QAM in the context of a multi-user OFDMA network and accounts for non-ideal (practical) outer codes. The system also reduces signaling overhead through strategies that minimize the amount of information the base-station has to feed back to the users. A signaling reduction technique is used that allows only equal (or constant) power allocation for each active user, i.e., each user must transmit with the same power on all its assigned tones. The system imposes bandwidth constraints that are motivated by practical concerns such as capabilities of mobile terminals as well as the fact that the cell-edge users may be able to transmit pilots with enough power only on a few subcarriers and consequently they may be scheduled only on those subcarriers.

DESCRIPTION

Figure 1:
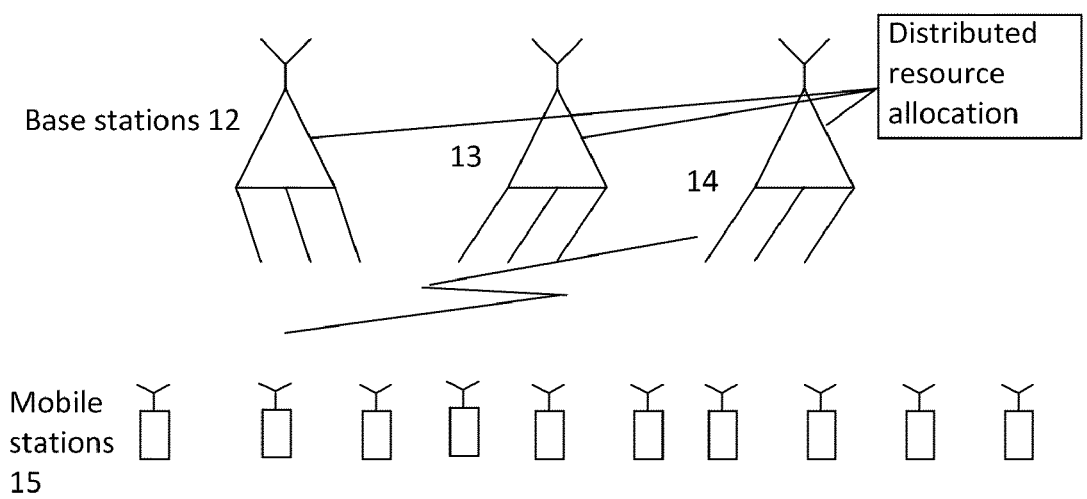
FIG. 1 shows an exemplary multiple-access system.

FIG. 1 shows an exemplary multiple-access system employing the standard OFDM modulation and demodulation, where the base-station (BS) communicates with K mobiles each having a single transmit antenna. In FIG. 1, K mobile users (block 15) are served by multiple BSs (blocks 12, 13, 14) on multiple sub-channels.

In a low mobility scenario, the channel coherence time is large enough to accommodate feedback delays as well as sufficiently large code lengths. If N is the total number of tones, the demodulated signal on the $n^{th}$ tone at the BS is given by $$y_n = \sum_{k=1}^{K} \sqrt{h_{kn} p_{kn}} x_{kn} + v_n, n = 1, 2, \cdots, N, \qquad (1)$$

where $\sqrt{h_{kn}}$ is the positive channel gain seen by user k on tone n, $v_n$ is the zero-mean unit-variance complex proper Gaussian ($\mathcal{CN}(0,1)$) additive noise variable. $x_{kn} \in S_{kn}$ is channel input from user k at tone n and $S_{kn}$ is a unit average energy constellation. Moreover, $S_{kn}$ can be any constellation from a set of constellations $S_k$. Thus user k is allowed to use a possibly different constellation for each tone.

$$\sum_{n=1}^{N} p_{kn}$$

is the total power transmitted by user k in one OFDM symbol duration and must satisfy $$\sum_{n=1}^{N} p_{kn} \leq P_k,$$

where $P_k$ is the specified power budget of user k. Due to the orthogonality constraint in an OFDMA system, i.e., $p_{kn}p_{jn}=0$, $k \neq j$, $\forall$ n the summation in (1) actually contains only one term.

Next, one exemplary modeling of a Practical MCS is discussed. In this discussion, a user k has a power and constellation assignment as $\{p_{kn}, S_{kn}\}$. Then, $$\sum_{n=1}^{N} I(S_{kn}, p_{kn} h_{kn}),$$

where $I(S_{kn}, p_{kn} h_{kn})$ denotes the (coded-modulation) mutual information, is the rate it can achieve over the parallel channel model, using an ideal code of coding rate $$\frac{\sum_{n=1}^{N} I(S_{kn}, p_{kn} h_{kn})}{\sum_{n=1}^{N} \log|S_{kn}|},$$

constructed on the assigned input alphabets. In order to account for the non-ideality of practical codes, the mutual information exponential system mapping (MIESM) method is used. The MIESM method is based on the observation that for good practical codes, the block error probability (BLER) versus normalized mutual information (also referred to as the average mutual information per-bit) curve is (almost) independent of the underlying modulations and depends mainly on the coding rate. In particular, over the parallel channel model, the system can achieve an acceptable BLER (less than 0.01) with a good practical code of coding rate $$\left( \frac{\sum_{n=1}^{N} I(S_{kn}, p_{kn} h_{kn})}{\sum_{n=1}^{N} \log|S_{kn}|} - \Gamma \right)^{+},$$

where the constant $\Gamma$ captures the loss due to the practical codes, which results in a sum rate of $$\left( \frac{\sum_{n=1}^{N} I(S_{kn}, p_{kn} h_{kn})}{\sum_{n=1}^{N} \log|S_{kn}|} - \Gamma \right)^{+} \sum_{n=1}^{N} \log|S_{kn}|.$$

A dummy constellation $\phi$ in $S_k$ is used with the constraint that if $S_{kn} = \phi$ then user k does not transmit on $n^{th}$ subcarrier. Also, $I(\phi, p_{kn} h_{kn}) = 0, \forall p_{kn}$, $$\log|\phi| = 0 \quad \& \quad \frac{0}{0} = 0.$$

As a result, for a given power profile the maximum rate that can be achieved by user k using the available modulations and practical codes, is given by $$\sum_{n=1}^{N} \max_{S_{kn} \in S_k} (I(S_{kn}, p_{kn} h_{kn}) - \Gamma \log|S_{kn}|). \qquad (2)$$

For an ideal code $\Gamma=0$ while $\Gamma \approx 0.1$ for the codes used in 3GPP and this value is used to model non-ideal codes in the sequel.

Next, the rate loss due to suboptimal power allocation is discussed. The system bounds the potential performance degradation caused by sub-optimal power allocation. In this process, $\mathcal{J}_k, 1 \leq k \leq K$ is the set of tones allocated to user k and $\{S_{kn}\} n \in \mathcal{J}_k$ is the constellation assignment, and the optimal power allocation for each user is then given by a mercury water filling (MWF) method. The MWF method determines the optimal power allocation over the parallel channel model for a given choice of input constellations. As opposed to the traditional water-filling which assumes Gaussian alphabets, the MWF explicitly accounts for the mutual information of the finite input alphabets which unlike the Gaussian alphabet case, saturates with increasing SNR. For any sub-optimal power allocation $\{p_{kn}\}$ that satisfies the power constraint with equality for each user, the achievable rate is at-most $\Delta$ bits away from the optimal rate achieved via the per-user MWF, where $\Delta$ is given by $$\Delta = \sum_{k=1}^{N} \Sigma_{n \in \mathcal{J}_k} p_{kn} \left( \max_{n \in \mathcal{J}_k} \{h_{kn} MMSE(S_{kn}, h_{kn} p_{kn})\} - h_{kn} MMSE(S_{kn}, h_{kn} p_{kn}) \right) \qquad (3)$$

where $MMSE(S_{kn}, h_{kn} p_{kn})$ denotes the minimum mean-square error in an AWGN channel with SNR $h_{kn} p_{kn}$ and input alphabet $S_{kn}$.

For a user k with $\{p_{kn}\}$ be a valid allocation that satisfies the power constraint with equality, i.e., $$\sum_{n=1}^{N} p_{kn} = P_k.$$

The optimal set of powers $\{\hat{p}_{kn}\}$ is obtained as the solution to $$\max_{[p_{kn}]_{p_{kn}} \geq 0 \forall n \ \& \ \Sigma_{n \in \mathcal{J}_k} p_{kn} \leq P_k} \Sigma_{n \in \mathcal{J}_k} I(S_{kn}, h_{kn} p_{kn}). \quad (4)$$

The optimization in (4) is a concave maximization problem since $I(S_{kn}, h_{kn} p_{kn})$ is concave in the power $p_{kn}$. Also note that Slater's condition is satisfied with any $P_k > 0$. Thus the strong duality property holds for (4). Define the Lagrangian $$L(\{p_{kn}, \mu_{kn}\}, \lambda_k) = \Sigma_{n \in \mathcal{J}_k} I(S_{kn}, h_{kn} p_{kn}) + \Sigma_{n \in \mathcal{J}_k} \mu_{kn} p_{kn} + \lambda_k (P_k - \Sigma_{n \in \mathcal{J}_k} p_{kn}) \quad (5)$$

and consider the dual function $$g(\{\mu_{kn}\}, \lambda_k) = \max_{\{p_{kn}\}} L(\{p_{kn}, \mu_{kn}\}, \lambda_k). \quad (6)$$

Let $g(\{\hat{\mu}_{kn}\}, \hat{\lambda}_k) = \min_{\{\mu_{kn} \geq 0\}, \lambda_k \geq 0} g(\{\mu_{kn}\}, \lambda_k)$. Due to strong duality:

$$g(\{\hat{\mu}_{kn}\}, \hat{\lambda}_k) = \Sigma_{n \in \mathcal{J}_k} I(S_{kn}, h_{kn} \hat{p}_{kn}). \quad (7)$$

As $\frac{\partial}{\partial p_{kn}} I(S_{kn}, h_{kn} p_{kn}) = h_{kn} MMSE(S_{kn}, h_{kn} p_{kn})$, for any $\{\tilde{\mu}_{kn} \geq 0\}, \tilde{\lambda}_k \geq 0$, the variables $\{\tilde{p}_{kn} \geq 0\}$ which satisfy $$h_{kn} MMSE(S_{kn}, h_{kn} \tilde{p}_{kn}) = \tilde{\lambda}_k - \tilde{\mu}_{kn} \ \forall \ n, \quad (8)$$

must be the maximizers in (6) for $\mu_{kn} = \tilde{\mu}_{kn}$ and $\lambda_k = \tilde{\lambda}_k$ so that from (7)

$$g(\{\tilde{\mu}_{kn}\}, \tilde{\lambda}_k) = L(\{\tilde{p}_{kn}, \tilde{\mu}_{kn}\}, \tilde{\lambda}_k) \geq g(\{\hat{\mu}_{kn}\}, \hat{\lambda}_k) = \Sigma_{n \in \mathcal{J}_k} I(S_{kn}, h_{kn} \hat{p}_{kn}). \quad (9)$$

For the given set of powers $\{p_{kn}\}$ if $$\lambda_k = \max_{n \in \mathcal{J}_k} \{h_{kn} MMSE(S_{kn}, h_{kn} p_{kn})\},$$

and $$\mu_{kn} = \max_{n \in \mathcal{J}_k} \{h_{kn} MMSE(S_{kn}, h_{kn} p_{kn})\} - h_{kn} MMSE(S_{kn}, h_{kn} p_{kn}), \ \forall \ n,$$

then (8) is satisfied. Further using the fact that $$\sum_{n=1}^{N} p_{kn} = P_k,$$

with (5) and (9):

$$\Delta_k = \sum_{n \in \mathcal{J}_k} I(S_{kn}, h_{kn} \hat{p}_{kn}) - \sum_{n \in \mathcal{J}_k} I(S_{kn}, h_{kn} p_{kn}) \leq \sum_{n \in \mathcal{J}_k} p_{kn} \left( \max_{n \in \mathcal{J}_k} \{h_{kn} MMSE(S_{kn}, h_{kn} p_{kn})\} - h_{kn} MMSE(S_{kn}, h_{kn} p_{kn}) \right). \quad (10)$$

Note that for Gaussian alphabets (i.e., when each $S_{kn}$ is a complex proper Gaussian random variable) the bound can be reduced. Adding up $\Delta_k$ for all users, the desired result in (3) is obtained.

Figure 2:
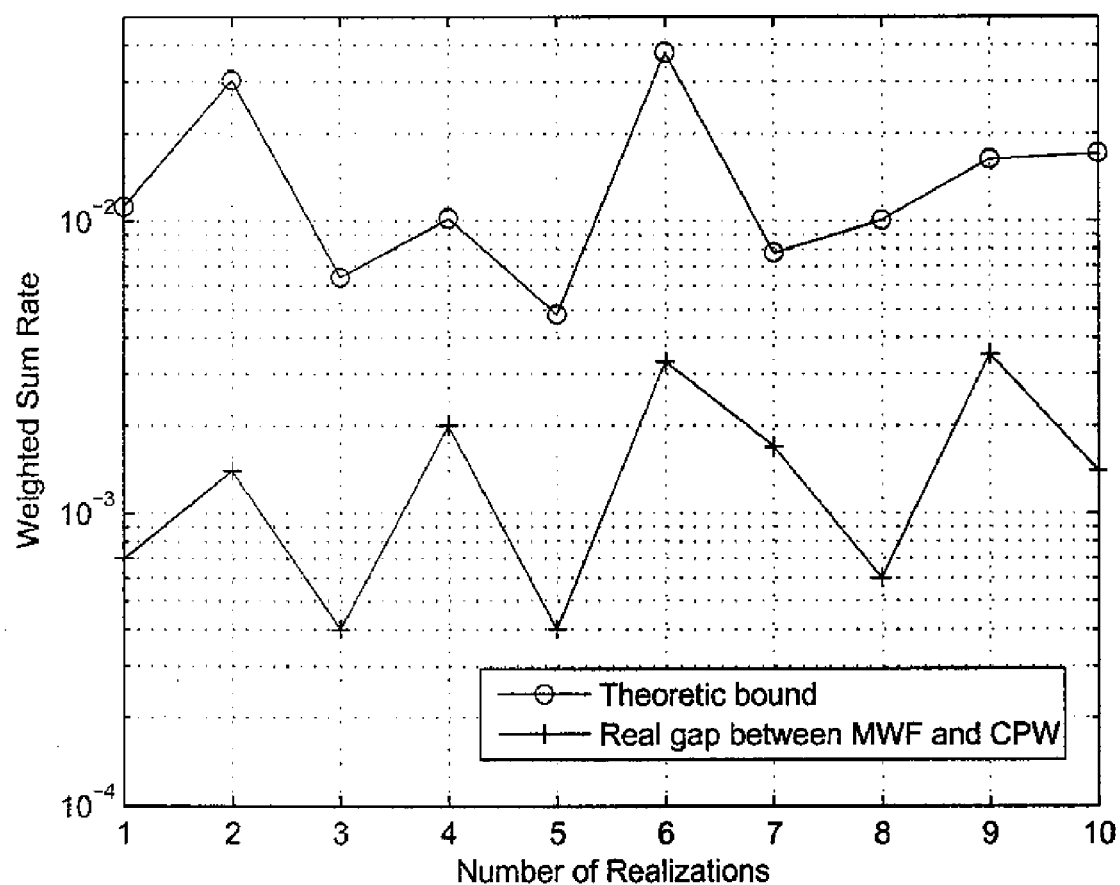
FIGS. 2-3 show exemplary numerical examples to compare the bound with the real sub-optimality gap between the solution obtained using various embodiments and the optimal objective function value.

FIG. 2 provides a numerical example on the bounded $\Delta$. In this example, an OFDMA system with 16 subcarriers and one user, QPSK modulation is assumed. Two power allocation schemes are considered, i.e., mercury water-filling and constant power water-filling (CWF). In CWF, the total power is evenly split among m subcarriers with the highest gains, where m is chosen to maximize the total rate. The theoretic gap $\Delta$ in (3) between the two power allocation schemes is compared against the real gap in terms of the sum rates obtained by simulations for different channel realizations. It is seen that the real gap is smaller than the theoretic bound. In addition, it is seen that the performance gap between CWF and MWF is rather small. This indicates that the performance loss of CWF is negligible compared with the optimal MWF if a proper frequency band is used. Similar phenomenon has been observed for Gaussian input alphabets. In this context, in a multi-user system employing channel dependent proportional fair scheduling, each scheduled user will be assigned a set of subcarriers over which it sees high channel gains and the gap between CWF and MWF would be small over such channels. In addition, CWF is much easier to implement in practice since it facilitates the design of low-complexity low-rate feedback resource allocation schemes and requires only very limited information exchange among base-stations, which is vital for distributed implementations in a multi-cell scenario. CWF is used in the following sections.

Next, two resource allocation problems are discussed. The resource allocation is performed on a frame-by-frame basis and all channel coefficients are assumed to be perfectly estimated by the BS at the beginning of each frame.

Type-1 Formulation: Fixed Power Per User Per Subcarrier

For an uplink OFDMA system with N subcarriers and K users., $\alpha_{ki}$ denotes an indicator variable such that it equals to one if the $i^{th}$ subcarrier is allocated to the $k^{th}$ user. $d(S_{ki}, p_{ki} h_{ki}) \triangleq I(S_{ki}, p_{ki} h_{ki}) - \Gamma \log |S_{ki}|$ denotes the effective rate of the $k^{th}$ user on the $i^{th}$ subcarrier when the constellation (or modulation) $S_{ki}$ is employed. The number of subcarriers allocated to the $k^{th}$ user is predetermined as $n_k$. The power level at each subcarrier for this user is then $$\frac{P_k}{n_k}.$$

$c_{ki}$ is the corresponding maximum achievable rate for the available modulations and practical codes, i.e., $$c_{ki} \triangleq \max_{S_{ki} \in \mathcal{S}_k} d\left(S_{ki}, \frac{P_k h_{ki}}{n_k}\right).$$

Further, if $w_k$ is the weighting factor (or priority) of the $k^{th}$ user, the resource allocation problem is given by $$\max \Sigma_k w_k (\Sigma_i c_{ki} \alpha_{ki})$$

$$\text{s.t. } \Sigma_k \alpha_{ki} \leq 1, \forall i; \Sigma_i \alpha_{ki} = n_k, \forall k; \alpha_{ki} \in \{0,1\}. \tag{11}$$

In (11)

$$\sum_{k=1}^{K} n_k \leq N.$$

For simplicity, this type of subcarrier assignment is referred to as the type-1 resource allocation hereafter.

If a power level per subcarrier $p_k$ as well as the minimum and maximum bandwidths (in number of subcarriers) $\tilde{n}_{kl}$, $\tilde{n}_{ku}$ respectively, have been specified for user k, for all $1 \leq k \leq K$ such that $\tilde{n}_{ku} p_k \leq P_k$ and $$\sum_{k=1}^{K}$$

$\tilde{n}_{kl} \leq N$. Let $\tilde{c}_{ki} \triangleq \max_{S_{ki} \in S_k} d(S_{ki}, p_k h_{ki})$. While the per-user maximum bandwidth constraint is motivated by the maximum power budget and maximum bandwidth capability of the user, the per-user minimum bandwidth constraint can ensure a stricter short-term resource fairness. The resource allocation problem is now given by $$\max \Sigma_k w_k (\Sigma_i \tilde{c}_{ki} \alpha_{ki})$$

$$\text{s.t. } \Sigma_k \alpha_{ki} \leq 1, \forall i, \tilde{n}_{kl} \leq \Sigma_i \alpha_{ki} \leq \tilde{n}_{ku}, \forall k; \alpha_{ki} \in \{0,1\}. \tag{12}$$

As shown in the sequel, (12) can be converted into (11) and hence with simplification, will also be referred to as type-1 resource allocation. The formulation in (12) can also accommodate another practically important constraint which imposes that a user k may be scheduled only on subcarriers in a specified set $\mathcal{J}_k \subset \{1, \ldots, N\}$. This constraint is applicable to cell-edge users who may be able sound (i.e., send pilots on) only a few subcarriers with sufficient power. For such a user, $\tilde{c}_{ki} = -\infty$, $\forall i \notin \mathcal{J}_k$, which will ensure that the optimal solution to (12) will not assign user k to any subcarrier not in $\mathcal{J}_k$.

Figure 4:
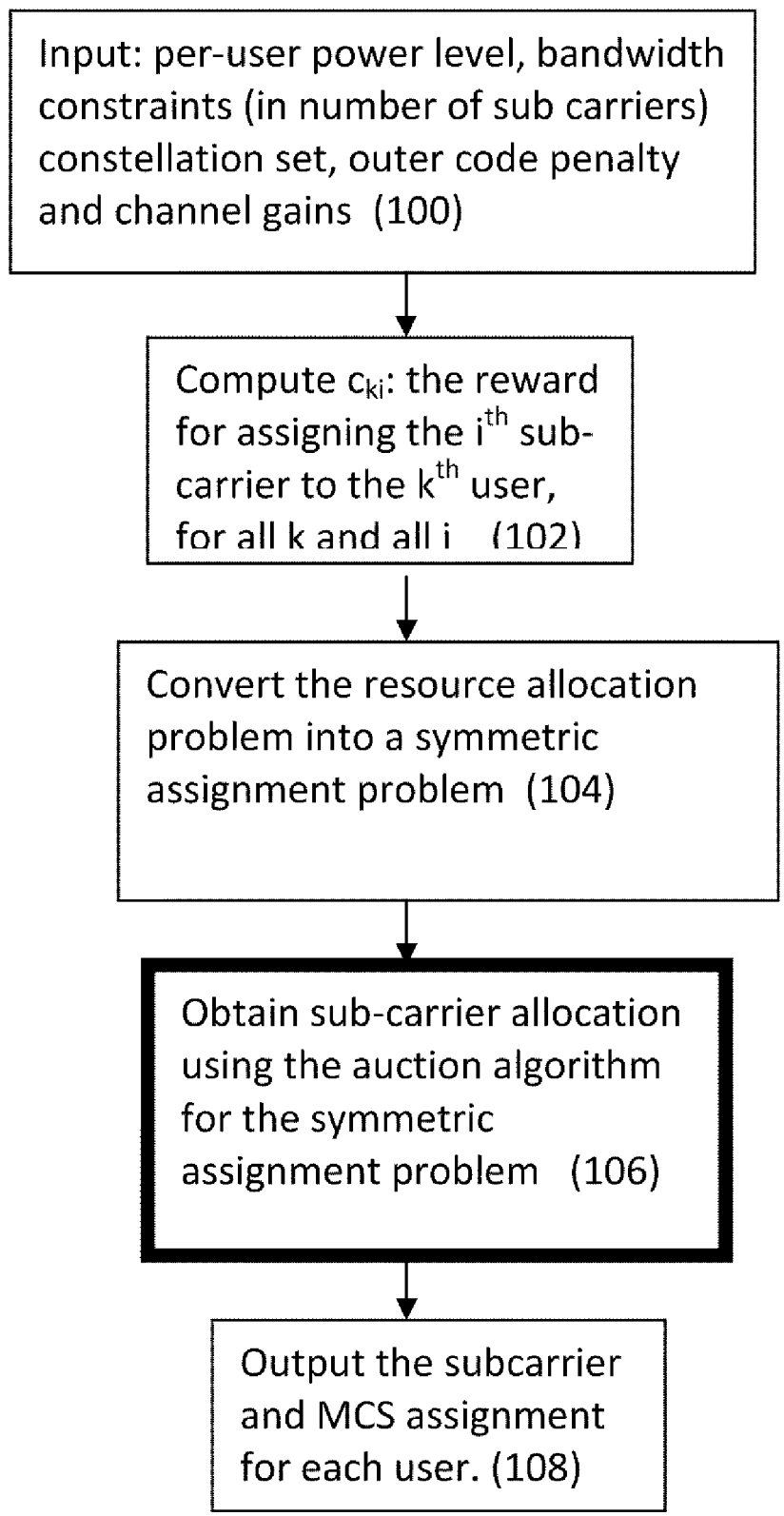
FIG. 4 shows an exemplary method for solving a single cell type 1 resource allocation.

FIG. 4 shows an exemplary process to solve single cell type 1 resource allocation. First, the process receives as input a per-user power level, bandwidth constraints (number of sub carriers), constellation set, outer code penalty and channel gains (100). Next, for all k and i, the process determines $c_{ki}$ as the reward for assigning the $i^{th}$ subcarrier to the $k^{th}$ user (102). The process converts the resource allocation problem into a symmetric assignment problem (104). Next, the process obtains sub-carrier allocations using the auction method for the symmetric assignment problem (106). The process then outputs the subcarrier and MCS assignment for each user (108).

The process of FIG. 4 incorporates Eq. 12 and determines the optimal subcarrier assignment in a single cell under fixed per user per subcarrier power constraints. The process also accounts for practical modulation and coding schemes.

Type-2 Formulation: Fixed Total Power Per User

In the second formulation, a total power budget $P_k$ is assigned to each user k, and the number of subcarriers allocated to user k lies between $n_{kl}$ and $n_{ku}$, where $0 \leq n_{kl} \leq n_{ku} \leq N$ and $$\sum_{k=1}^{K} n_{kl} \leq N.$$

$P_k$ is evenly split among all subcarriers assigned to the user.

Let $c_{ki}{}^n$ be the maximum achievable rate under the available MCS when the $i^{th}$ subcarrier is allocated to the $k^{th}$ user and the number of subcarriers allocated to the $k^{th}$ user is n, i.e., $$c_{ki}^n \triangleq \max_{S_{ki} \in S_k} d\left(S_{ki}, \frac{P_k h_{ki}}{n}\right)$$

with $c_{ki}^0 \triangleq 0$. $\alpha_{ki}{}^n$ is an indicator variable such that $\alpha_{ki}{}^n = 1$ if the $i^{th}$ subcarrier is allocated to the $k^{th}$ user and the total number of subcarriers allocated to the $k^{th}$ user is n. Likewise, $\beta_k{}^n$ is an indicator variable such that $\beta_k{}^n = 1$ if the number of subcarriers allocated to the $k^{th}$ user is n. The subcarrier allocation problem can then be formulated as $$\max \sum_{k} w_k \left( \sum_{n=n_{kl}}^{n_{ku}} \sum_{i} c_{ki}^n \alpha_{ki}^n \right) \tag{13}$$

$$\text{s.t.} \sum_{k} \sum_{n=n_{kl}}^{n_{ku}} \alpha_{ki}^n \leq 1, \forall i; \sum_{i} \alpha_{ki}^n = n\beta_k^n, n_{kl} \leq n \leq n_{ku}, \forall k;$$

$$\sum_{n=n_{kl}}^{n_{ku}} \beta_k^n = 1, \forall k; \alpha_{ki}^n, \beta_k^n \in \{0, 1\}.$$

Problem (13) will be referred to as the type-2 resource allocation hereafter.

Auction Methods for Single-Cell Resource Allocation

The symmetric assignment problem is a special 0-1 combinatorial optimization problem that can be solved efficiently. For N persons and N objects, a reward $f_{kj}$ can be associated with assigning the $j^{th}$ object to the $k^{th}$ person. The goal of the assignment problem is to assign each object to a person such that the total reward is maximized. In particular:

$$\max \Sigma_k \Sigma_j f_{kj} \eta_{kj}$$

$$\text{s.t. } \Sigma_k \eta_{kj} = 1, \forall j; \Sigma_j \eta_{kj} = 1, \forall k, \eta_{kj} \in \{0,1\}, \tag{14}$$

where $\eta_{kj}$ is a 0-1 indicator variable such that it is 1 if the $j^{th}$ object is assigned to the $k^{th}$ user. Unlike most combinatorial optimization problems, the assignment problem can be solved efficiently. Specifically, the LP polytope of an assignment problem is exactly the convex hull of its integer solutions, thus the optimal solution can be obtained by directly solving its LP relaxation. There exist a number of methods to solve the assignment problem, ranging from the classical Hungarian method to the primal-dual method, but they have high computational complexity and memory requirement. The auction method used herein has a low complexity and memory requirement, and can solve practical large-scale assignment problems.

The auction process is an intuitive method for solving the assignment problem. It mimics a competitive bidding process in which unassigned persons raise their prices and bid for objects simultaneously. After getting bids from all persons, objects are assigned to the highest bidder. More specifically, given a positive scalar $\epsilon$ and a set of prices $\{r_j, j=1, \ldots, N\}$ a person k is termed as happy with the assignment of object $j_k$ if the profit (i.e., reward minus price) of assigning the object $j_k$ to himself is within $\epsilon$ from the optimal, i.e., $$f_{kj_k} - r_{j_k} \geq \max_j \{f_{kj} - r_j\} - \varepsilon. \quad (15)$$

The auction method gradually proceeds towards a full assignment of objects to persons such that all persons are happy. The basic auction process is given as follows.

Process 1 Basic Auction for Symmetric Assignment Problem
1. Initialization: Select $\epsilon > 0$; set all N persons as unhappy and set $r_j = 0$, $j=1, \ldots, N$.
2. Repeat
   (a) Choose an unhappy person k, calculate its maximum profit $\gamma_{kj_k} = \max_j \{f_{kj} - r_j\}$ and the second maximum profit $\delta_{kj_k} = \max_{j, j \neq j_k} \{f_{kj} - r_j\}$.
   (b) Assign object $j_k$ to person k. If this object has been assigned to another person $\bar{k}$ before, remove that assignment to person $\bar{k}$. Further, if person k had been assigned to an object $\bar{j}_k$ prior to being assigned object $j_k$, assign object $\bar{j}_k$ to user $\bar{k}$.
   (c) Update the price of object $j_k$ as $r_{j_k} = r_{j_k} + \gamma_{kj_k} - \delta_{kj_k}$.
   (d) Set user k as happy. Decide if user $\bar{k}$ is happy or unhappy with its current assignment by checking (15).
3. Until all users are happy.

The above process is guaranteed to converge to an assignment scheme that yields a total reward within $N\epsilon$ from the optimal objective function value of (14). The number of iterations to converge to an assignment scheme in the above auction method typically decreases linearly with increasing of $\epsilon$. A proper $\epsilon$ can be selected to trade off the performance and number of iterations in practice. Also, the complexity of the auction process is linear at each iteration, and the memory required to store the price variables is also very low.

Single-cell Resource Allocation
Type-1 Resource Allocation Process

Type-1 resource allocation problem (11) uses the auction method. Additionally, a dummy user is used with index $k=0$, such that $c_{0i} = 0$, $\forall$ i and set its bandwith as $$n_0 = \left( N - \sum_{k=1}^{K} n_k \right)^+,$$

with the understanding that any subcarrier assigned to the dummy user is not used for data transmission. Without loss of generality, each subcarrier will be assigned to some user, dummy or otherwise. The process divides the $k^{th}$ user into $n_k$ "sub-users". Define $\alpha_{kli}$, $l=1, 2, \ldots, n_k$, as an indicator function such that $\alpha_{kli} = 1$ if the $i^{th}$ subcarrier is occupied by the $l^{th}$ sub-user of the $k^{th}$ user. Furthermore, let $w_{kl} \triangleq w_k$ and $c_{kli} \triangleq c_{ki}$, $l=1, 2, \ldots, n_k$, $\forall k$. Thus problem (11) is converted to $$\max \Sigma_k \Sigma_l w_{kl} (\Sigma_i c_{kli} \alpha_{kli})$$

s.t. $\Sigma_k \Sigma_l \alpha_{kli} = 1$, $\forall i$; $\Sigma_i \alpha_{kli} = 1$, $\forall k, l$; $\alpha_{kli} \in \{0, 1\}$, (16)

which is a standard (i.e., symmetric) assignment problem, and can be efficiently solved by the standard auction method, i.e., Process 1.

Eq. 12 can also be optimally solved using the auction process by introducing auxiliary variables. For convenience, the weighted rate (reward) of any user on any subcarrier is assumed to be non-negative. If $$\sum_{k=1}^{K} \tilde{n}_{ku} \leq N,$$

without loss of optimality, each inequality constraint $\Sigma_i \alpha_{ki} \leq \tilde{n}_{ku}$ can be replaced with the equality constraint $\Sigma_i \alpha_{ki} = \tilde{n}_{ku}$ and the ignore the superfluous constraint $\Sigma_i \alpha_{ki} \geq \tilde{n}_{kl}$. Consequently, problem (11) is obtained and can be solved using the aforementioned technique. Next if $$\sum_{k=1}^{K} \tilde{n}_{ku} > N \text{ and } \sum_{k=1}^{K} \tilde{n}_{ku} - N$$

"dummy" subcarriers are introduced with the understanding that no user will use any dummy subcarrier assigned to it for data transmission. Further, the $k^{th}$ user can be split into $\tilde{n}_{ku}$ sub-users having identical rewards as the $k^{th}$ user for each one of the N (real) subcarriers. The key step now is to select any $\tilde{n}_{kl}$ out of the $\tilde{n}_{ku}$ sub-users and set the reward of each one of these sub-users to be $-\infty$ for each dummy subcarrier. Each one of the remaining $\tilde{n}_{ku} - \tilde{n}_{kl}$ sub-users gets a reward of zero for any dummy subcarrier. This step results in no loss of optimality and also ensures that at-least $\tilde{n}_{kl}$ sub-users corresponding to user k are allocated real (non-dummy) subcarriers and this becomes problem (11) which can be solved optimally using the auction process.

Type-2 Resource Allocation Process

The auction method, however, cannot be directly used to solve the type-2 resource allocation problem (13). This is because the number of subcarriers allocated to each user is unknown, and therefore it cannot be converted directly into an assignment problem. A sub-optimal process for this problem is discussed next that leverages the auction method. This process consists of two stages, i.e., initial solution calculation and iterative improvement. At the first stage, a feasible solution is obtained by solving a corresponding type-1 resource allocation problem. This initial solution can achieve a weighted sum rate within a constant fraction of the optimal solution to (13). A tree-search method is used to iteratively improve the solution.

If each user must occupy at least one subcarrier, i.e. $n_{kl} \geq 1$, $\forall$ k, and Q and $\{\tilde{\alpha}_{ki}, \forall k, i\}$ denote respectively the optimal objective function value and the solution to the problem given below, $$\max \sum_k w_k \left( \sum_i c_{ki}^{n_{kl}} \alpha_{ki} \right) \quad (17)$$

s.t. $\sum_k \alpha_{ki} \leq 1$, $\forall$ i; $n_{kl} \leq \sum_i \alpha_{ki} \leq n_{kui}$, $\forall$ k; $\alpha_{ki} \in \{0, 1\}$.

Eq. (17) can be obtained from (12) by replacing $\tilde{c}_{ki}$ with $c_{ki}^{n_{kl}}$ and imposing the corresponding maximum and minimum bandwidth constraints. Define $Q_0 \triangleq \Sigma_k w_k \Sigma_i c_{ki}^{n_{ku}} \tilde{\alpha}_{ki}$ and let $Q^*$ be the optimal objective function value of (13):

1. $Q \geq Q^* \geq Q_0$.
2. $Q_0$ is at least a fraction $$\min_{\{k,i|\tilde{\alpha}_{ki}=1\}} \frac{c_{ki}^{n_{ku}}}{c_{ki}^{n_{ki}}}$$

of the optimal objective function value, i.e., $$\frac{Q_0}{Q^*} \geq \min_{\{k,i|\tilde{\alpha}_{ki}=1\}} \frac{c_{ki}^{n_{ku}}}{c_{ki}^{n_{ki}}}.$$

3. For an ideal code with $$\Gamma = 0, \quad \frac{Q_0}{Q^*} \geq \min_k \frac{n_{ki}}{n_{ku}}.$$

The first claim follows immediately from the fact that for all $n$: $n_{kl} \leq n \leq n_{ku}$, $$c_{ki}^{n_{ku}} = \max_{S_{ki} \in S_k} d\left(S_{ki}, \frac{P_k h_{ki}}{n_{ku}}\right) \leq c_{ki}^n \quad (18)$$

$$= \max_{S_{ki} \in S_k} d\left(S_{ki}, \frac{P_k h_{ki}}{n}\right) \leq c_{ki}^{n_{ki}}$$

$$= \max_{S_{ki} \in S_k} d\left(S_{ki}, \frac{P_k h_{ki}}{n_{ki}}\right),$$

where any modulation $S_{ki}$, $d(S_{ki}, p\ h_{ki})$ is monotonic in $p$.

As to the second result, note that $Q = \Sigma_k w_k \Sigma_i c_{ki}^{n_{ki}} \tilde{\alpha}_{ki}$. Thus it follows that $$\frac{Q_0}{Q^*} \geq \frac{Q_0}{\overline{Q}} = \frac{\Sigma_k w_k \Sigma_i c_{ki}^{n_{ku}} \tilde{\alpha}_{ki}}{\Sigma_k w_k \Sigma_i c_{ki}^{n_{ki}} \tilde{\alpha}_{ki}} \geq \min_{\{k,i|\tilde{\alpha}_{ki}=1\}} \frac{c_{ki}^{n_{ku}}}{c_{ki}^{n_{ki}}}. \quad (19)$$

Further, if an ideal code with $\Gamma=0$ is assumed:

$$\frac{c_{ki}^{n_{ku}}}{c_{ki}^{n_{ki}}} = \frac{\max_{S_{ki} \in S_k} I\left(S_{ki}, \frac{P_k h_{ki}}{n_{ku}}\right)}{\max_{S_{ki} \in S_k} I\left(S_{ki}, \frac{P_k h_{ki}}{n_{ki}}\right)} \quad (20)$$

$$= \left[\frac{\max_{S_{ki} \in S_k} I\left(S_{ki}, \frac{P_k h_{ki}}{n_{ku}}\right)}{I\left(S_{ki}^*, \frac{P_k h_{ki}}{n_{ku}}\right)} \frac{I\left(S_{ki}^*, \frac{P_k h_{ki}}{n_{ku}}\right)}{I\left(S_{ki}^*, \frac{P_k h_{ki}}{n_{ki}}\right)}\right]_{S_{ki}^* = \arg\max_{S_{ki} \in S_k} I\left(S_{ki}, \frac{P_k h_{ki}}{n_{ki}}\right)} \quad (21)$$

$$\geq \frac{P_k / n_{ku}}{P_k / n_{ki}} = \frac{n_{ki}}{n_{ku}}. \quad (22)$$

The inequality in the above formula follows from the fact that the mutual information function under any finite modulation scheme is concave in its input power level and its value is zero when the input power is zero, so that, $$\max_{S_{ki} \in S_k} I\left(S_{ki}, \frac{P_k h_{ki}}{n_{ku}}\right) \geq I\left(S_{ki}^*, \frac{P_k h_{ki}}{n_{ku}}\right) \geq \frac{P_k / n_{ku}}{P_k / n_{ki}} I\left(S_{ki}^*, \frac{P_k h_{ki}}{n_{ki}}\right). \quad (23)$$

Hence $\frac{Q_0}{Q^*} \geq \min_k \frac{n_{ki}}{n_{ku}}$.

Upon getting an initial solution via solving (17), the system can iteratively improve the obtained solution through a tree-search type method. Each node in this tree corresponds to a set specifying the number of subcarriers assigned to each user, i.e., $\{n_k\}_{k=1}^K$, and it is associated with an objective function value which can be obtained by solving the corresponding type-1 resource allocation problem given in (11) using Process 1. The obtained subcarrier assignment scheme is then used to generate a group of child nodes from the current node, and a simple method is used to calculate a lower bound to the objective function value of each child node. If the lower bound to the objective function value of a child node is larger than the objective function value of the current parent node, this child node is kept in the tree for further investigation. Otherwise, it is removed from the tree. The process is summarized below.

Figure 3:
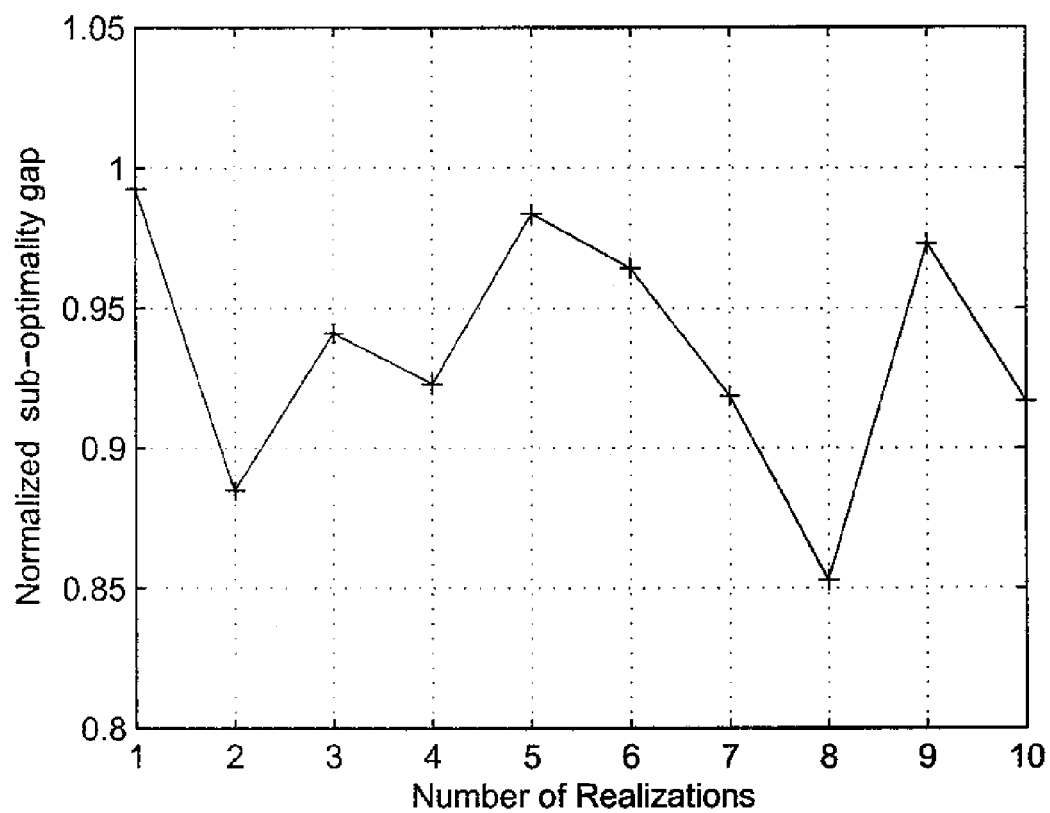

Process 2 Auction for Type-2 Resource Allocation
1. Initialization: perform the type-1 resource allocation for the problem (17). Let $\{n_1, \ldots, n_K\}$ denote the set formed by the number of subcarriers allocated to each user obtained upon solving (17). Add this set into a FIFO queue. Initialize the value of the current best value, $\rho$, to be zero.
2. While the queue is not empty
   (a) Pick up the first set, say $\{n_1, \ldots, n_K\}$ in the queue, in which $n_k$ denotes the number of subcarriers allocated to user k. Use the procedure for type-1 resource allocation, with constant bandwidths $\{n_1, \ldots, n_K\}$ and constant power levels $\{P_k/n_k\}$ to perform the subcarrier assignment. Set $\rho$ to be equal to the maximum of current best value and the obtained objective function value.
   (b) In the subcarrier assignment obtained in Step (a), select any subcarrier that is not assigned to any user or if all the subcarriers are assigned, then among all the subcarriers that are assigned to users exceeding their respective minimum bandwidth constraints, choose the subcarrier with smallest weighted rate (reward). Suppose the selected subcarrier is the $j^{th}$ subcarrier and the associated user (if any) is $k_j$.
   (c) Remove the $j^{th}$ subcarrier from user $k_j$ and perform the equal power allocation for user $k_j$ (if the $j^{th}$ subcarrier was assigned). Sequentially add this subcarrier to the assignment of every other user (except user $k_j$) not equalling its maximum bandwidth constraint, and perform the equal power allocation for that user and store the obtained weighted sum rate.
   (d) Among all sets in obtained in Step (c) add those sets into the queue for which the corresponding weighted sum rates are larger than $\rho$.
3. End while Process 2 can also initialize the queue with multiple sets. Moreover, to limit complexity the process can run for only for a specified number of iterations. Let $Q_k$ denote the best objective function value up to the $k^{th}$ iteration of Process 2. The system can bound the performance loss between the obtained solution and the optimal solution, i.e., $Q^* - Q_k \leq Q - Q_k$. In practice, if this upper bound is small, it is guaranteed that the obtained solution is close to the optimal. FIG. 3 shows a numerical example to compare the bound in the above proposition with the real sub-optimality gap between the solution obtained by Process 2 and the optimal objective function value in an OFDMA system with 16 subcarriers and 4 users. The minimum and maximum number of subcarriers allocated to each user are set as 3 and 6 respectively. All users' weight factors are set as 1. 10 iterations are performed in Process 2. All users are assumed to be at equal distance from the BS and have identical power budget. QPSK modulation is assumed. The optimal objective function value is obtained by enumerating all feasible sets specifying the number of subcarriers allocated to each user, i.e., $\{\{n_1, \ldots, n_K\}: 3 \leq n_k \leq 6, \forall k, \Sigma_k n_k \leq 16\}$, and performing subcarrier assignment for each set using the basic auction process. The normalized sub-optimality gap is defined as the ratio between the real sub-optimality gap $Q^* - Q_k$ and the theoretic bound $$\overline{Q} - Q_k, \text{ i.e., } \frac{Q^* - Q_k}{\overline{Q} - Q_k}.$$

The derived bound can give an accurate estimation of the real sub-optimality gap.

The first step in Process 2 provides a feasible solution which yields a sum rate within a fraction of the optimal objective function value of (13). This initialization method, however, becomes inapplicable if there are no minimum bandwidth constraints, i.e., $n_{kl}=0$, for some users. In the single-user scenario without any bandwidth constraints and under the equal power constraint, the $k^{th}$ user will select the subcarriers with the $m_k$-largest channel gains, where $m_k$ depends on the available maximum power, modulation set and channel gains and can be determined via the single-user CWF. It is intuitive that for most of the cases in the multi-user scenario with proportional fair scheduling, the optimal solution will not allocate more than $m_k$ subcarriers to user k. This is because due to multiuser diversity, a user is likely to be scheduled on its best (or good) subcarriers and it is unlikely to occupy more than $m_k$ of these. This motivates the following initialization method for Process 2.

Process 3 Initialization for Type-2 Resource Allocation if there are no Minimum Bandwidth Constraints for Some Users 1. Determine $m_k$ for user k, $\forall k$, using the single-user CWF. Update $m_k \rightarrow \max\{n_{kl}, \min\{m_k, n_{ku}\}\}$ $\forall k$.
2. Repeat
    (a) Use the procedure for type-1 resource allocation, with maximum bandwidths $\{m_1, \ldots, m_K\}$, minimum bandwidths $\{n_{1l}, \ldots, n_{Kl}\}$ and constant power levels $\{P_k/m_k\}$ to perform the subcarrier assignment. Let $n_k$ denote the obtained number of subcarriers for user k, $\forall k$.
    (b) Set $m_k = n_k$, $\forall k$.
3. Until Convergence Another procedure for sub-optimally solving the type-2 problem in (13) when $n_{kl}=0$, $n_{ku}=N$ for all k, is given in FIG. 8.

Multi-cell Resource Allocation Process

In a multi-cell OFDMA system, a a mobile user not only competes for resources with users in its own cell, but also generates interference for base-stations in adjacent cells. A possible strategy under such scenario is to simply treat interference from other cells as noise, which may severely reduce the system capacity due to the strong interference from edge users in other cells. A better alternative is to jointly consider resource allocation across different cells, and thereby maximize the total system throughput.

Users are divided into two groups, i.e., interior users and edge users. An interior user does not generate interference for the base-stations in adjacent cells; while an edge user can cause such interference. Notice there exist various criteria to categorize users into the two groups. For example, a straightforward method is to categorize users according to their distances to the corresponding base stations. If a user is close enough to the base station in an adjacent cell, it is treated as an edge user. Another possible strategy is to divide users based on their instantaneous channel conditions. Next, "virtual" users are defined to capture the interaction of users in different cells. Every edge user generates a virtual user for each adjacent cell to which that edge user will generate interference. Every virtual user occupies the same subcarriers as its corresponding edge user and each cell must allocate non-overlapping subcarriers to its interior, edge and virtual users. In this way the system can decompose a multi-cell resource allocation problem into a group of single-cell resource allocation problems in which the interference between users in different cells are represented by constraints between edges users and corresponding virtual users. The general problem of resource allocation in multi-cell OFDMA systems is then given by maximize: Weighted total sum rate
subject to: Constraints for interior users, edge users and virtual users in every single-cell;
Every edge user shares the same resource as its corresponding virtual users (24).

Assume there are B base stations. $k_j$ represents a user in the $j^{th}$ cell and $\mathcal{A}_j$ represents a set of users not in cell j such that every user $k_{i, i \neq j} \in \mathcal{A}_j$ can generate interference to the $j^{th}$ cell. $\hat{k}_{ij}$ denotes the virtual user generated for the $j^{th}$ cell by edge user $k_i$. The first multi-cell subcarrier allocation problem is formulated and assumes that a power level along with minimum and maximum bandwidths have been specified for each user. This assumption will satisfied in LTE cellular systems which will employ fractional frequency reuse (FFR), where a higher power level will be specified for each edge user and a lower one for each interior user. Then, let $c_{kjl}$ denote the rate obtained by allocating the $l^{th}$ subcarrier in the $j^{th}$ cell to user $k_j$, $n_{kjl}$ and $n_{kju}$ represent the minimum and maximum number of subcarriers that can be occupied by user $k_j$, respectively. $\alpha_{kjl}$ is an indicator variable such that $\alpha_{kjl}=1$ if subcarrier l is assigned to user $k_j$. The following formulation is the extension of (12) to multiple cells.

$$\max \Sigma_j \Sigma_{kj} w_{kj} (\Sigma_l c_{kjl} \alpha_{kjl})$$

such that $\Sigma_{kj} \alpha_{kjl} + \Sigma_{kj \in \mathcal{A}_j} \alpha_{kijl} \leq 1, \forall l, j; n_{kjl} \leq \Sigma_l \alpha_{kjl} \leq n_{kju}, \forall k_j, j;$ $$\alpha_{\hat{k}_{ij}l} = \alpha_{k_il}, \forall l, k_i \in \mathcal{A}_j; \alpha_{kjl} \in \{0,1\}, \forall l, k_j, j. \quad (25)$$

The first two groups of constraints are the same as in the single-cell case. The third group of constraints models the effect of inter-cell interference. This type of resource allocation problem is defined as multi-cell type-1 resource allocation problem hereafter. Note that the problem in (25) is feasible if and only if $N \geq \Sigma_{kj} n_{kjl} + \Sigma_{k_i \in \mathcal{A}_j} n_{k_il}, \forall j$. Further, due to the coupling of subcarrier allocations between the cells, it is non-trivial to obtain a good feasible solution via a low-complexity distributed approach. For simplicity, the edge users do not have minimum bandwidth constraints, i.e., $n_{kjl}=0$ when $k_j$ is an edge user in cell j. This allows feasible solutions in a simple manner without cumbersome feasibility checks. The assumption is not too restrictive since the weights of the edge users can be increased to ensure that they are not starved. Moreover, in practice high rate applications requiring minimum bandwidth guarantees are not supported for edge users.

Figure 5:
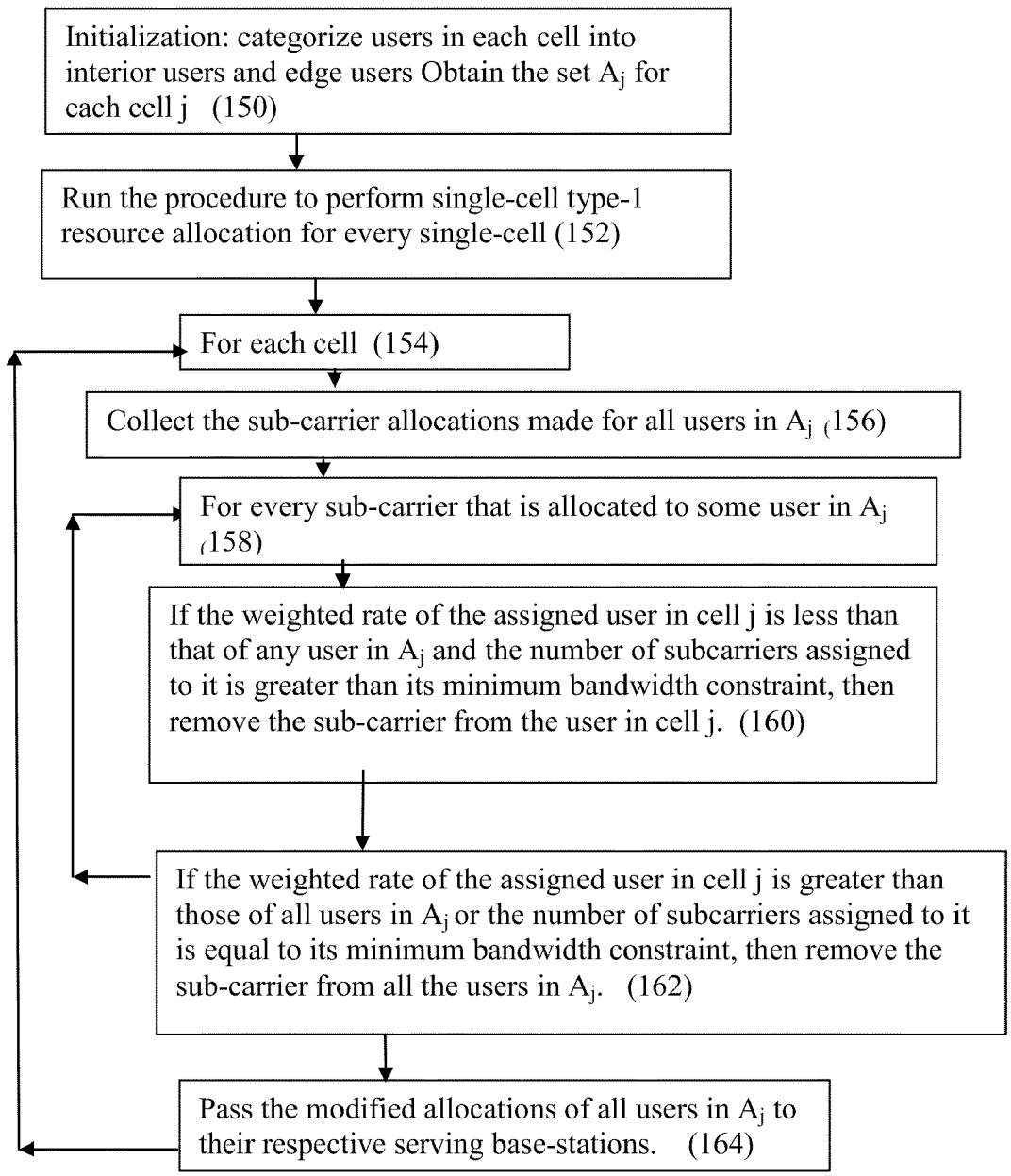
FIG. 5 shows an exemplary auction and greedy method for type 1 resource allocation.

Turning now to FIG. 5, an exemplary process to perform auction and greedy method for type 1 resource allocation. First, initialization is performed by categorizing users in each cell as interior or edge users (150). Next, the process of FIG. 4 is run to perform single cell type-1 resource allocation for every single cell (152). Next, for each cell, the auction and greedy process for multi-cell resource allocation is done (154). In this operation, the process collects the sub-carrier allocations made for all users in Aj (156). For every sub-carrier that is allocated to user(s) in Aj, the process reallocates sub-carrier (158). If the weighted rate of the assigned user in a cell j is less than that of any user in Aj, and the number of sub-carriers assigned to the cell si greater than its minimum bandwidth constraint, then the process removes the sub-carrier from the user in cell j (160). Next, the process determines if the weighted rate of the assigned user in cell j is greater than those of all users in Aj or the number of subcarriers assigned to it is equal to its minimum bandwidth constraint, then the process removes the subcarrier from all users in Aj (162). Operations 160 and 162 are repeated for each subcarrier. When all subcarriers have been handled, the process passes the modified allocations of all users in Aj to their respective serving base stations (164), and the operations are then repeated until all cells are handled.

The solution to the LP relaxation of the problem in (25), i.e., with the relaxed constraints $\alpha_{kjl} \in [0,1]$, $\forall k_j, l, j$, may contain fractional values for some $\{\alpha_{kjl}\}$ and therefore may not be a feasible solution to (25). However, this solution can become feasible and hence optimal in the limit of large number of subcarriers, as shown next. The total number of users in the system remains fixed.

Figure 6:
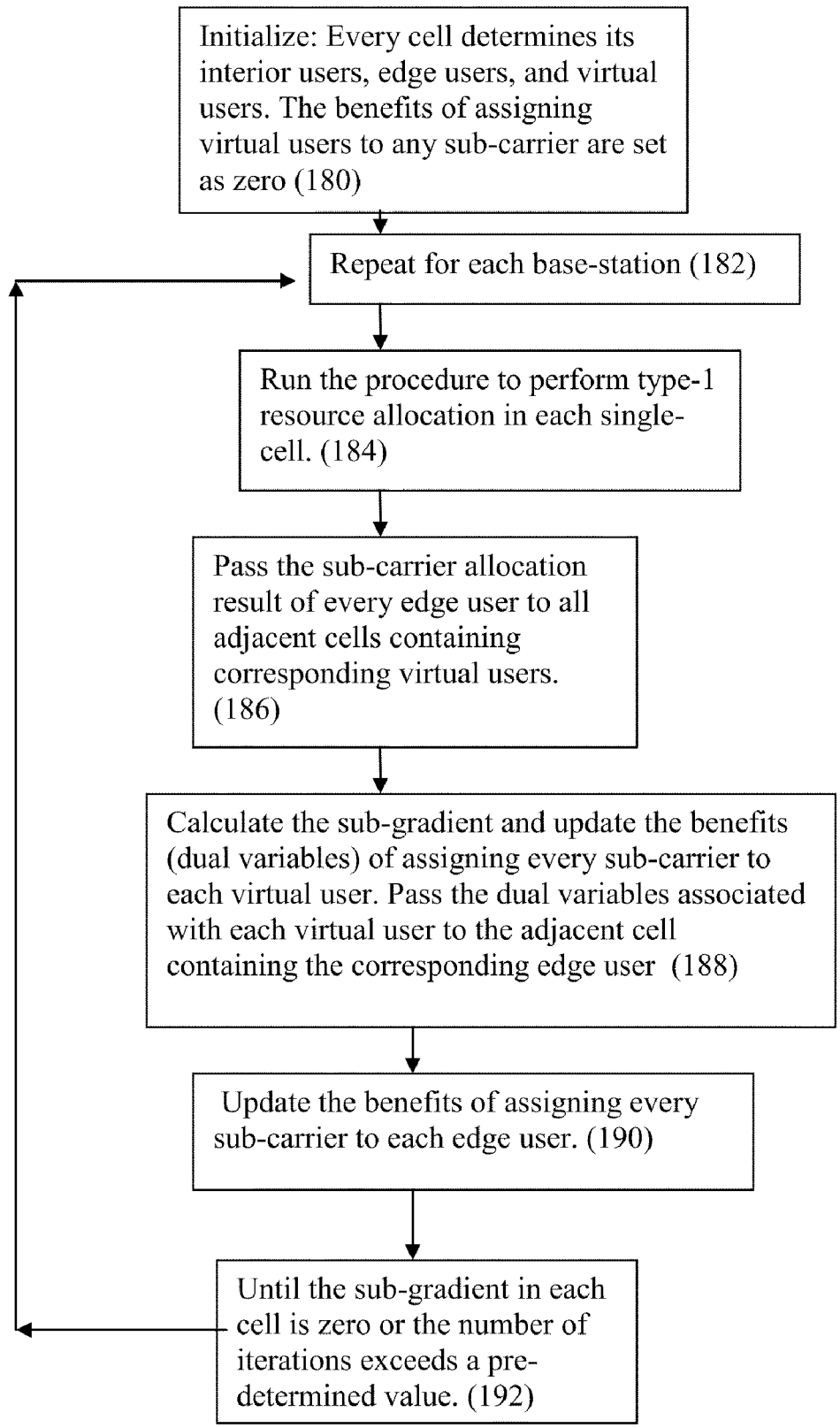
FIG. 6 shows an exemplary combined auction and dual method for type 1 resource allocation.

FIG. 6 shows an exemplary combined auction and dual method for type 1 resource allocation. During initialization, each cell determines its interior users, edge users, and virtual users (180). Further, the benefits of assigning virtual users to any sub-carrier are set to zero (180). Next, each base station runs a multi-cell resource allocation (182). During this operation, the process of FIG. 4 is applied to each cell (184). The process passes the sub-carrier allocation result of each edge user to all adjacent cells containing corresponding virtual users (186). The process determines the sub-gradient and updates the benefits of assigning every sub-carrier to each virtual user (188). The dual variables associated with each virtual user are then passed to the adjacent cell containing the corresponding edge user. Next, the process updates the benefits of assigning every sub-carrier to each edge user (190). Operations 184-190 is repeated until the sub-gradient in each cell is zero or the number of iterations exceed a predetermined threshold (192).

An optimal solution of the LP relaxation to (25) is also an optimal solution to the multi-cell type-1 resource allocation problem if the number of subcarriers in the system increases to infinity. The LP relaxation of (25) with continuous frequency variables given by $$\max \Sigma_j \Sigma_{kj} w_{kj} (\int c_{kj}(f) \alpha_{kj}(f) df)$$

$$s.t.\ \Sigma_{kj} \alpha_{kj}(f) + \Sigma_{kj\epsilon} \mathcal{A}_j \alpha_{\tilde{k}ij}(f) \leq 1,\ \forall f, j;\ \delta_{kj} \leq \int \alpha_{kj}(f) df \leq \gamma_{kj},\ \forall k_j, j$$

$$\alpha_{\tilde{k}ij}(f) = \alpha_{k_i}(f), \forall f, k_i \in \mathcal{A}_j j;\ \alpha_{kj}(f) \geq 0, \forall f, k_j, j. \quad (26)$$

where $\delta_{kj}$ and $\gamma_{kj}$ are the minimum and maximum bandwidths that user $k_j$ can occupy, respectively, and the integrals are over a closed bounded interval corresponding to the allocated system bandwidth. In the following an optimal solution to (26) has non-overlapping binary-valued allocation for each cell, i.e., $\alpha_{kj}(f)\alpha_{q_j}(f)=0$, $q_j \neq k_j$ and $\alpha_{k_i}(f) = \alpha_{\tilde{k}_{ij}}(f)$ with $\alpha_{kj}(f) \in \{0,1\}$.

First consider the case when all channel responses of all users are constants so that each $c_{kj}(f) = c_{kj}$ is also a constant. In this case, for any spectrum allocation that is feasible for (26), a non-overlapping binary valued feasible allocation can be constructed that achieves identical weighted sum rate. Consequently, there exists a non-overlapping binary valued feasible allocation that is also optimal. Next, when all channel responses of all users are continuous functions of f, then all $c_{kj}(f)$ are also continuous functions of f. Further since a continuous function in a closed bounded interval is also uniformly continuous, all $c_{kj}(f)$ are also uniformly continuous in f. Consequently, since there are finitely many users, for any arbitrarily small but fixed $\epsilon > 0$ a piecewise constant aid $\tilde{c}_{kj}(f)$ can be obtained such that $c_{kj}(f) \geq \tilde{c}_{kj}(f) - \epsilon$, $\forall k_j, j$. Each piecewise constant $\tilde{c}_{kj}(f)$ is defined by a finite partition, i.e., its range is a finite set. Then, consider the problem $$\max \Sigma_j \Sigma_{kj} w_{kj} (\int \tilde{c}_{kj}(f) \alpha_{kj}(f) df)$$

$$s.t.\ \Sigma_{kj} \alpha_{kj}(f) + \Sigma_{k_j\epsilon} \mathcal{A}_j \alpha_{\tilde{k}ij}(f) \leq 1,\ \forall f, j;\ \delta_{kj} \leq \int \alpha_{kj}(f) df \leq \gamma_{kj},\ \forall k_j, j$$

$$\alpha_{\tilde{k}ij}(f) = \alpha_{k_i}(f), \forall f, k_i \in \mathcal{A}_j j;\ \alpha_{kj}(f) \geq 0, \forall f, k_j, j. \quad (27)$$

The objective function in (26) when evaluated for any optimal solution to (27) will yield a value that is within $\epsilon \Sigma_j \Sigma_{kj} w_{kj} \gamma_{kj}$ of the optimal value of (26). The problem in (27) and let $\mathcal{P}$ denotes the partition obtained by taking the union of all partitions corresponding to all $\{\tilde{c}_{kj}(f)\}$. $\mathcal{P}$ is a finite partition and in each frequency band in it, all $\{\tilde{c}_{kj}(f)\}$ are constants. Thus, there must exist a non-overlapping binary valued feasible allocation that is also optimal for (27). In sum, there must exist a non-overlapping binary valued feasible allocation that yields a value no less than $\epsilon \Sigma_j \Sigma_{kj} w_{kj} \gamma_{kj}$ from the optimal value of (26). Finally since $\epsilon$ can be made arbitrarily small the above discussion is true.

The problem of multi-cell subcarrier allocation under the equal power and bandwidth constraints (multi-cell type-2 resource allocation) can be formulated as follows, $$\max \Sigma_j \Sigma_{kj} w_{kj} (\Sigma_{n_{kjl} \leq n \leq n_{kju}} \Sigma_l c_{kjl}^n \alpha_{kjl}^n)$$

$$s.t.\ \Sigma_{kj} \Sigma_{n_{kjl} \leq n \leq n_{kju}} \alpha_{kjl}^n + \Sigma_{k_j \in Aj} \Sigma_{n_{kjm} \leq n \leq n_{kju}} \alpha_{\tilde{k}ijl}^n \leq 1,$$
$$\forall l, j;\ \Sigma_l \pi_{kjl}^n = n \beta_{kj}^n,\ \forall\ n_{kjl} \leq n \leq n_{kju}, k_j, j$$

$$\Sigma_{n_{kjl} \leq n \leq n_{kju}} \beta_{kj}^n 1, \forall k_j, j;\ \alpha_{\tilde{k}kijl}^n = \alpha_{kjl}^n,\ \forall\ l,\ n_{k_il} \leq n \leq n_{kju},$$
$$k_i \in \mathcal{A}_j j;\ \alpha_{kjl}^n, \beta_{kj}^n \in \{0,1\}. \quad (28)$$

Distributed Method for Resource Allocation

Next, low-complexity distributed processes which yield near-optimal solutions to the multi-cell resource allocation problems will be discussed. The first method is a greedy process, which consists of two steps. In the first step, the auction method is independently performed for resource allocation in every cell ignoring the constraint that each edge user and its corresponding virtual user(s) must share the same resource. The reward for allocating a subcarrier in a cell to any of its virtual users is set as zero in the first step, so no cell will allocate any resource to its virtual users. In the second step every edge user occupies the same subcarriers as its corresponding virtual user(s), by trading subcarriers in a greedy fashion. The detailed process is given below.

Process 4 Greedy Method with Auction Process for Mutli-Cell Type-1 Resource Allocation
1. Initialization: categorize users into interior users and edge users. Obtain the set $\mathcal{A}_j$ for each cell j.
2. Run Process 1 to perform type-1 resource allocation for every single-cell.
3. For the $j^{th}$ cell, where $1 \leq j \leq B$ (a) Collect the subcarrier allocation result for each user in $\mathcal{A}_j$ (b) For every assigned subcarrier in cell j,
   i. If the weighted rate of the assigned user in cell j is less than that of any user in $A_j$ and the number of subcarriers assigned to it are greater than its minimum bandwidth constraint, then remove the subcarrier from the assigned user in cell j.
   ii. Otherwise, remove the subcarrier from all the users in $\mathcal{A}_j$
   iii. Pass the updated subcarrier allocation result of each user in $\mathcal{A}_j$ to its serving base station.

(c) End for

4. End for

Likewise, an auction-based greedy process can be used for multi-cell type-2 resource allocation problem. The main difference is that in the second step the sub-optimal Process-2 is run for each cell (with the alternate initialization if needed). Further, in the third step when a subcarrier is taken away from a user, its power is increased accordingly over each of its remaining assigned subcarriers.

In another subcarrier allocation scheme based on a combination of Lagrange dual method and the auction method, part of constraints is moved into the objective function to obtain a partial Lagrangian and the resulting problem of finding the dual function decouples into a several single-cell problems. To illustrate, in the multi-cell type-1 resource allocation, the dual function is obtained as:

$$\max \Sigma_j \Sigma_{kj} w_{kj}(\Sigma_l c_{kjl}\alpha_{kjl}) + \Sigma_j \Sigma_{k_j \in \mathcal{A}_j} \Sigma_l \lambda_{kijl}(\alpha_{kkijl} - \alpha_{k_jl})$$

$$\text{s.t. } \Sigma_{kj} \alpha_{kjl} + \Sigma_{k_j \in \mathcal{A}_j} \alpha_{kijl} \leq 1, \forall l,j; n_{kjl} \leq \Sigma_l \alpha_{kjl} \leq n_{kju}, \forall k_j,j; \alpha_{kjl}, \alpha_{kijl} \in \{0,1\}, \forall l,k_j,j. \quad (29)$$

The above optimization problem decomposes into subcarrier allocation problems for each cell. The subproblems can be exactly solved in an efficient manner by the auction process proposed in the previous section. After performing subcarrier allocations for each cell, let $g(\lambda)$ denote the solution of the above problem for a given $\lambda$. These subproblems are coordinated by a high-level master problem, given by $\min_\lambda g(\lambda)$.

This dual master problem can be solved by a subgradient method in a distributed manner. Let $s(\lambda)$: denote the subgradient of the function $g(\lambda)$. The element of $s(\lambda)$ with corresponding index $\{j,\hat{k}_{ij},l,k_i\}$ is given by $\alpha_{\hat{k}_{ij}l} - \alpha_{k_i l}$, where $\{\alpha_{\hat{k}_{ij}l}, \alpha_{k_i l}\}$ are the optimal solutions of (29). The vector of dual variables can be updated by $\lambda^{k+1} = \lambda^k - \gamma_k s(\lambda^k)$ where $\gamma_k$ is a step size. The scheme based on the dual decomposition method and auction process is as follows:

Process 5 Joint Action and Dual Decomposition for Multi-Cell Type-1 Resource Allocation 1. Initialization: Every base station determines its interior users, edge users, and virtual users. The reward of assigning virtual users to any subcarrier is set as zero.

2. Repeat
   (a) Run Process 1 to perform type-1 resource allocation for each single-cell.
   (b) The base station of each edge user sends the edge user's subcarrier allocation result to its adjacent base stations containing the corresponding virtual users.
   (c) Each base station calculates the sub-gradient and updates the rewards (dual variables) of assigning every subcarrier to each virtual user.
   (d) The base station of each edge user collects the dual variables from the base stations serving the edge user's corresponding virtual users.
   (e) Every base station updates the rewards of assigning every subcarrier to each edge user.

3. Until subgradient is zero or the number of iterations exceeds a pre-determined threshold.

This dual method can be readily extended to solve the multi-cell type-2 resource allocation problem. The only difference is that Process 2 is run (with the alternate initialization if needed) to perform the type-2 resource allocation at the first step of each iteration. As in other dual decomposition methods for OFDMA, strong duality property is not guaranteed for finite N. Here, the third step described in the greedy Process 4 recovers a primal feasible solution upon convergence of the dual variables or after a predetermined number of iterations of the sub-gradient method. However, if at convergence the computed sub-gradient is a vector of all zeros, then the solution obtained in (29) is also a primal feasible solution and hence optimal. Also, the following proposition can help to computationally assess the performance of the proposed method after finite number of iterations.

After I iterations of the above combined auction and dual decomposition method, let $Q_p(I), Q_d(I)$, and $Q^*$ denote the rates achieved by the obtained primal feasible solution, the dual solution, and the optimal solution, respectively, then $Q_p(I) \leq Q^* \leq Q_d(I)$.

In practice, if the gap between $Q_p(I)$ and $Q_d(I)$ is small enough, it is guaranteed that a near-optimal solution has been obtained. Furthermore, although the solution obtained by the joint auction and dual decomposition method is not necessarily optimal for finite N, for the multi-cell type-1 resource allocation problem, it is guaranteed to be asymptotically optimal in the limit as the number of subcarriers goes to infinity. Further, the solution derived by the joint auction and dual decomposition for the multi-cell type-1 resource allocation problem is asymptotically optimal in the limit as the number of subcarriers in every cell goes to infinity.

Figure 7:
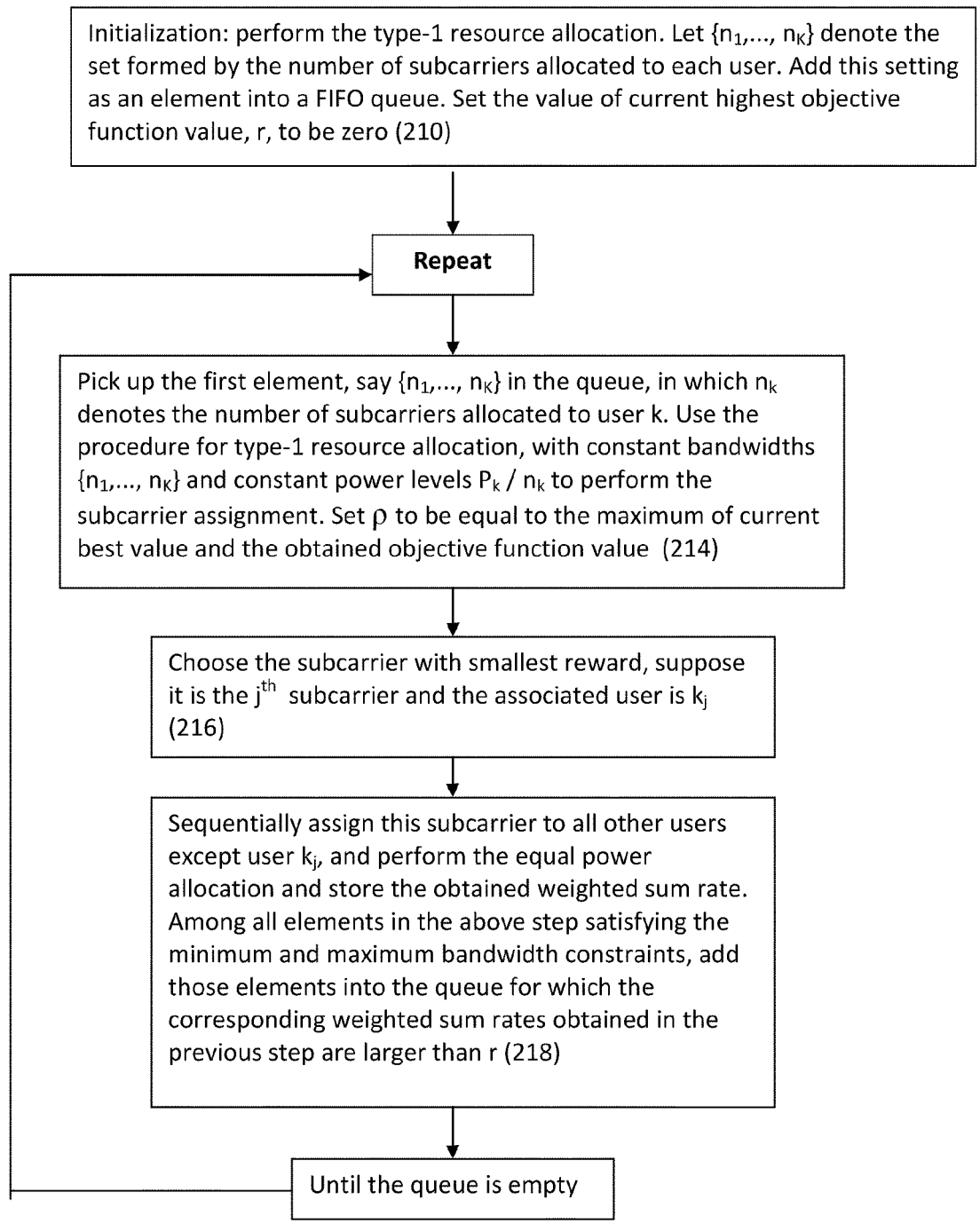
FIG. 7 shows an exemplary auction method for type 2 resource allocation.

FIG. 7 shows an exemplary auction method for type 2 resource allocation. In this process, initialization is done as in type-1 resource allocation. In this process, $\{n_1, \ldots, n_K\}$ denotes a set formed by the number of subcarriers allocated to each user. The process adds the set as an element into a FIFO queue and sets the value of current highest objective function value, r, to be zero (210).

Next, the process selects the first element, say $\{n_1, \ldots, n_K\}$ in the queue, in which $n_k$ denotes the number of subcarriers allocated to user k. The process applies the procedure for type-1 resource allocation, with constant bandwidths $\{n_1, \ldots, n_K\}$ and constant power levels $P_k/n_k$ to perform the subcarrier assignment. The process sets ρ to be equal to the maximum of current best value and the obtained objective function value (214).

The process then selects the subcarrier with smallest reward, suppose it is the $j^{th}$ subcarrier and the associated user is $k_j$ (216). The process sequentially assigns this subcarrier to all other users except user $k_j$, and performs equal power allocation and stores the obtained weighted sum rate. The process then locates among all elements in the above step satisfying the minimum and maximum bandwidth constraints, and adds those elements into the queue for which the corresponding weighted sum rates obtained in the previous step are larger than r (218).

Figure 8:
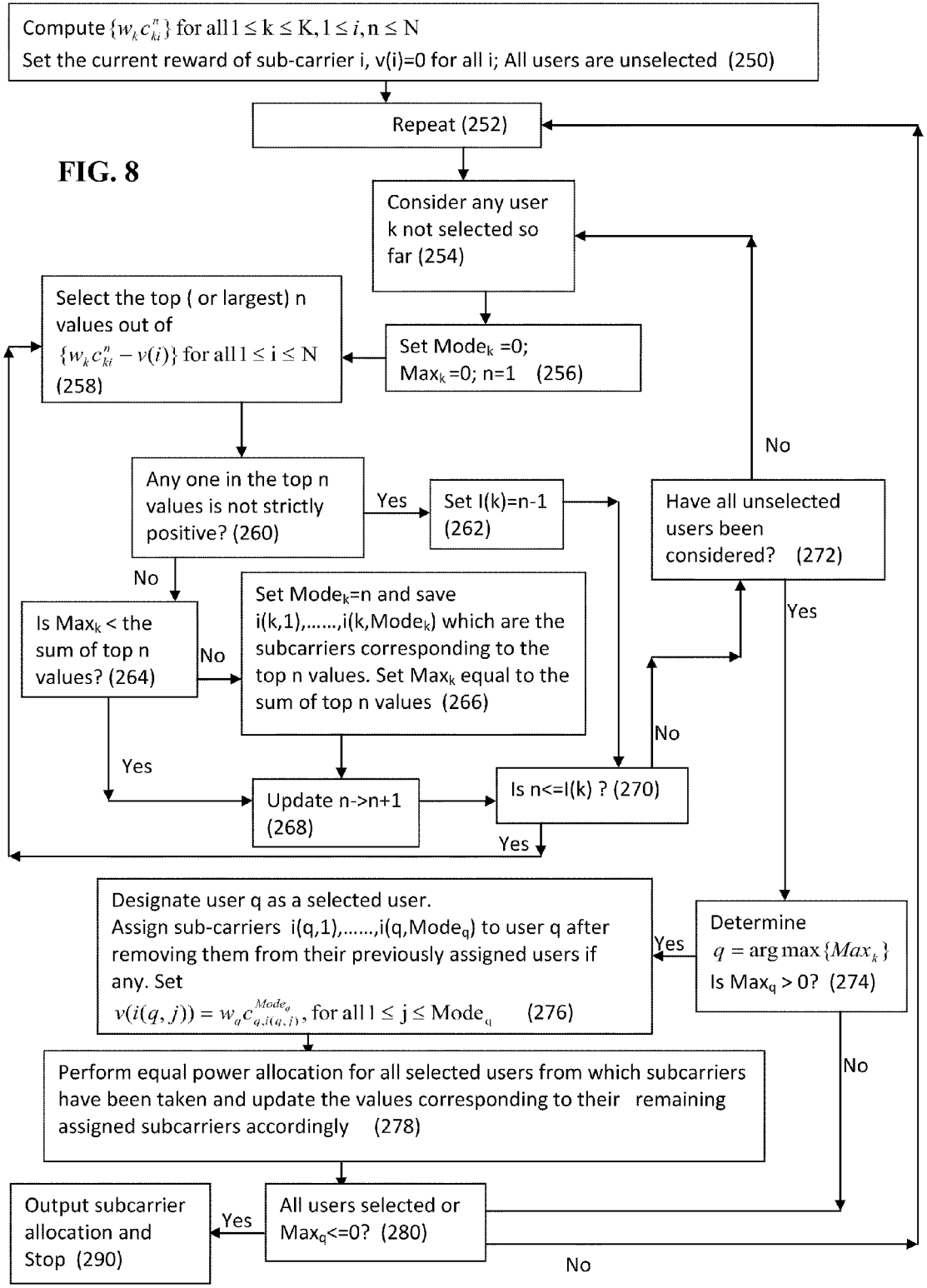
FIG. 8 shows another exemplary auction method for type 2 resource allocation.

FIG. 8 shows another an exemplary auction method for type 2 resource allocation. The process in FIG. 8 obtains a solution to the type-2 resource allocation problem in (13). The obtained solution is near-optimal.

The procedure is a greedy one in which at the initial step no sub-carrier is assigned to any user. Subsequently, at each step the process selects and assigns sub-carriers to a user (from the set of users which have not been selected yet) that results in the largest positive increase in the system utility. The process terminates when either all users have been selected or when no user (from the set of users which have not been selected yet) can offer an increase in the system utility, Turning now to FIG. 8, the process performs initialization by computing $\{w_k c_{ki}{}^n\}$ for all $1 \leq k \leq K$, $1 i,n \leq N$ and sets the current reward of sub-carrier i, v(i)=0 for all i. All users are unselected (250).

Next, for each user, the process iterates in a loop (252). The process works on any user k not selected so far (254). For each user, the process sets the $\text{Mode}_k$ to 0 and sets $\text{Max}_k=0$; n=1 (256). The process then selects the top (or largest) n values out of $\{w_k c_{ki}{}^n - v(i)\}$ for all $1 \leq i \leq N$ (258) and checks to see if anyone in the top n values is not positive (260). Next, the process sets I(k)n−1 (262) and then checks if $\text{Max}_k$ is less than the sum of top n values (264). The process then sets the $\text{Mode}_k$ to n and saves i(k,1), . . . ,i(k,$\text{Mode}_k$) which represent the subcarriers corresponding to the top n values. The process also set $\text{Max}_k$ equal to the sum of top n values (266). From 264 or 266, the process increments n (268) and then checks if n is less than or equal to I(k) in 270). If not, the process proceeds to 272 to determine whether unselected users remain to be processed (272). Alternatively, if n is less than or equal to 1(k), the process loops back to 258.

From 272, the process determines q=arg max$\{\text{Max}_k\}$ and checks if $\text{Max}_q$ is greater than zero (274). Next, in 276, the process designates a user q as a selected user and assigns sub-carriers i(q,1), . . . ,i(q,$\text{Mode}_q$) to user q after removing them from their previously assigned users if any. The process also sets $v(i(q, j)) = x_q c_{q,i(q,j)}^{\text{Mode}_q}$, for all $1 \leq j \leq \text{Mode}_q$ (276). Next, the process performs equal power allocation for all selected users from which subcarriers have been taken and update the values corresponding to their remaining assigned subcarriers accordingly (278). From 274 or 278, the process checks if all users have been processed or if a maximum threshold has been met (280). If no, the process loops back to 252 to continue processing the users and if true, the process outputs the subcarrier allocation and exits (290).

The auction method for two resource allocation problems in uplink OFDMA networks. Both single-cell and multi-cell scenarios have been considered. The processes are designed for finite input alphabets and also account for non-ideal practical outer codes. In addition, power and bandwidth constraints motivated by practical concerns have also been handled well. The processes have very low complexity and can be implemented in a distributed fashion, when employed for multi-cell resource allocation. It is shown through both theoretical analysis and simulation studies that the system offers near-optimal performance. Several numerical examples have been done to demonstrate the performance of proposed Processs and substantiate the theoretical claims, as discussed in more detail in Provisional Application Ser. No. 61/035,400 filed on Mar. 11, 2008, the content of which is incorporated by reference. The result shows that Process 4 can improve the total system throughput considerably while Process 5 can further increase the system throughput but with an additional complexity. Both processes are distributed and of low complexity.

The above system applies an auction based approach to solve the single-cell resource allocation problem. The problem can be converted into a classical assignment problem and optimally solved by the auction method. Extended embodiments of the single-cell resource allocation procedure are applied to a multi-cell OFDMA uplink using an auction plus greedy method as well as a combined auction and dual decomposition approach. The system is low in complexity, as the complexity of the methods at each iteration increases only linearly with the number of subcarriers in the system. The method is much lower in complexity than the greedy method. The methods can obtain the optimal solution for the single-cell problem and can achieve solutions close to optimal for the multi-cell problem. Compared with the greedy method, the total single-cell throughput can be improved by up to 20%. The methods are well suited for parallel and distributed implementation. The resource allocation methods support practical modulation and coding scheme (MCS) rather than the commonly assumed Gaussian input alphabets and ideal outer codes. While Gaussian alphabets greatly simplify analysis, their main drawback is that the capacity with Gaussian input is unbounded in the signal-to-noise ratio (SNR) which results in too much power being allocated by a user to its stronger subcarriers.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to assign power, sub-carrier(s), modulation and coding scheme(s) resources in a multi-user system with one or more cells, comprising:

specifying a resource allocation problem for allocating the resources;

converting the resource allocation problem into an assignment problem;

solving the assignment problem through an auction process;

allocating the resources to cellular users to maximize a system utility; and determining a single cell type 1 resource allocation according to $$\max \sum_k w_k \left( \sum_i \tilde{c}_{ki} \alpha_{ki} \right)$$

such that $\sum_k \alpha_{ki} \leq 1$, $\forall i$, $\tilde{n}_{kl} \leq \sum_i \alpha_{ki} \leq \tilde{n}_{ku}$, $\forall k$; $\alpha_{ki} \in \{0,1\}$, where $W_k$ comprises a weight factor of a user k, $\tilde{c}_{ki}$ comprises a throughput when assigning a subcarrier i to the user k, $\alpha_{ki}$ comprises an indicator on whether the subcarrier i is allocated to the user k, $\tilde{n}_{kl}$ comprises a lower bound on the total subcarriers assigned to the user k, and $\tilde{n}_{ku}$ comprises an upper bound on the total subcarriers assigned to the user k.

2. The method of claim 1, comprising determining a multi-cell type 1 resource allocation according to $$\max \sum_j \sum_{k_j} w_{k_j} \left( \sum_l c_{k_j l} \alpha_{k_j l} \right)$$

such that $\Sigma_{k_j} \alpha_{k_j l} + \Sigma_{k_i \in \mathcal{A}_j} \alpha_{k_i j l} \leq 1$, $\forall l,j$; $n_{k_j l} \leq \Sigma_l \alpha_{k_j l} \leq n_{k_j u}$, $\forall k_j, j$; $\alpha_{k_{ij} l} = \alpha_{k_i l}$, $\forall l, k_i \in \mathcal{A}_{jj}$, $j$; $\alpha_{k_j l} \in \{0,1\}$, $\forall l,k_j,j$, where $w_{kj}$ comprises a weight factor of a user in a jth cell, $c_{kjl}$ comprises a throughput when assigning a subcarrier l to a user k in a cell j, $\alpha_{kjl}$ comprises an indicator of whether the subcarrier l is allocated to the user k in cell j, and $n_{kjl}$ comprises a lower bound of the total subcarriers assigned to the user k in cell j.

3. A method to assign power, sub-carrier(s), modulation and coding scheme(s) resources in a multi-user system with one or more cells, comprising specifying a resource allocation problem for allocating the resources;

converting the resource allocation problem into an assignment problem;

solving the assignment problem through an auction process;

allocating the resources to cellular users to maximize a system utility; and directing the resources using the auction process resulting in a largest increase in the system utility, removing a sub-carrier allocated to a user in a cell if a weighted rate of the user on the sub-carrier is less than one of the corresponding weighted rates of users in adjacent cells and the number of subcarriers assigned to the cell is greater than a minimum bandwidth constraint.

4. The method of claim 3, comprising receiving as input a per-user power level, one or more bandwidth constraints, a constellation set, an outer code penalty, and channel gain information.

5. The method of claim 3, wherein the assignment problem comprises a symmetric assignment problem.

6. The method of claim 3, comprising determining a sub-carrier assignment for each user.

7. The method of claim 6, wherein the subcarrier assignment is determined under fixed per-user per subcarrier power, practical modulation and coding scheme(s) and per-user bandwidth constraint(s).

8. The method of claim 3, comprising removing a sub-carrier allocated to a user in adjacent cells if a weighted rate of a user on the sub-carrier in a given cell is greater than corresponding weighted rates of other users in adjacent cells or if the number of subcarriers assigned to the user is equal to a minimum bandwidth constraint.

9. The method of claim 3, wherein the resource comprises one or more resources in an Orthogonal Frequency-Division Multiple Access (OFDMA) uplink.

10. The method of claim 3 comprising selecting and assigning one or more sub-carriers to a user from a set of users which have not been selected yet that results in the largest increase in the system utility.

11. A method to assign power, sub-carrier(s), modulation and coding scheme(s) resources in a multi-user system with one or more cells, comprising:

specifying a resource allocation problem for allocating the resources;

converting the resource allocation problem into an assignment problem;

solving the assignment problem through an auction process;

allocating the resources to cellular users to maximize a system utility;

performing a carrier assignment with constant bandwidths for a set $\{n_1, \ldots, n_K\}$ and constant power level $P_k/n_k$, where $n_k$ denotes the number of subcarriers allocated to user k;

selecting a subcarrier with the smallest reward for a user $k_j$ and assigning the selected subcarrier to all other users except user $k_j$, and performing equal power allocation for the user over assigned sub-carriers to obtain a weighted sum rate.

* * * * *